(No Model.) 5 Sheets—Sheet 1.
H. WIEDLING.
VALVE GEAR FOR ENGINES.
No. 341,085. Patented May 4, 1886.
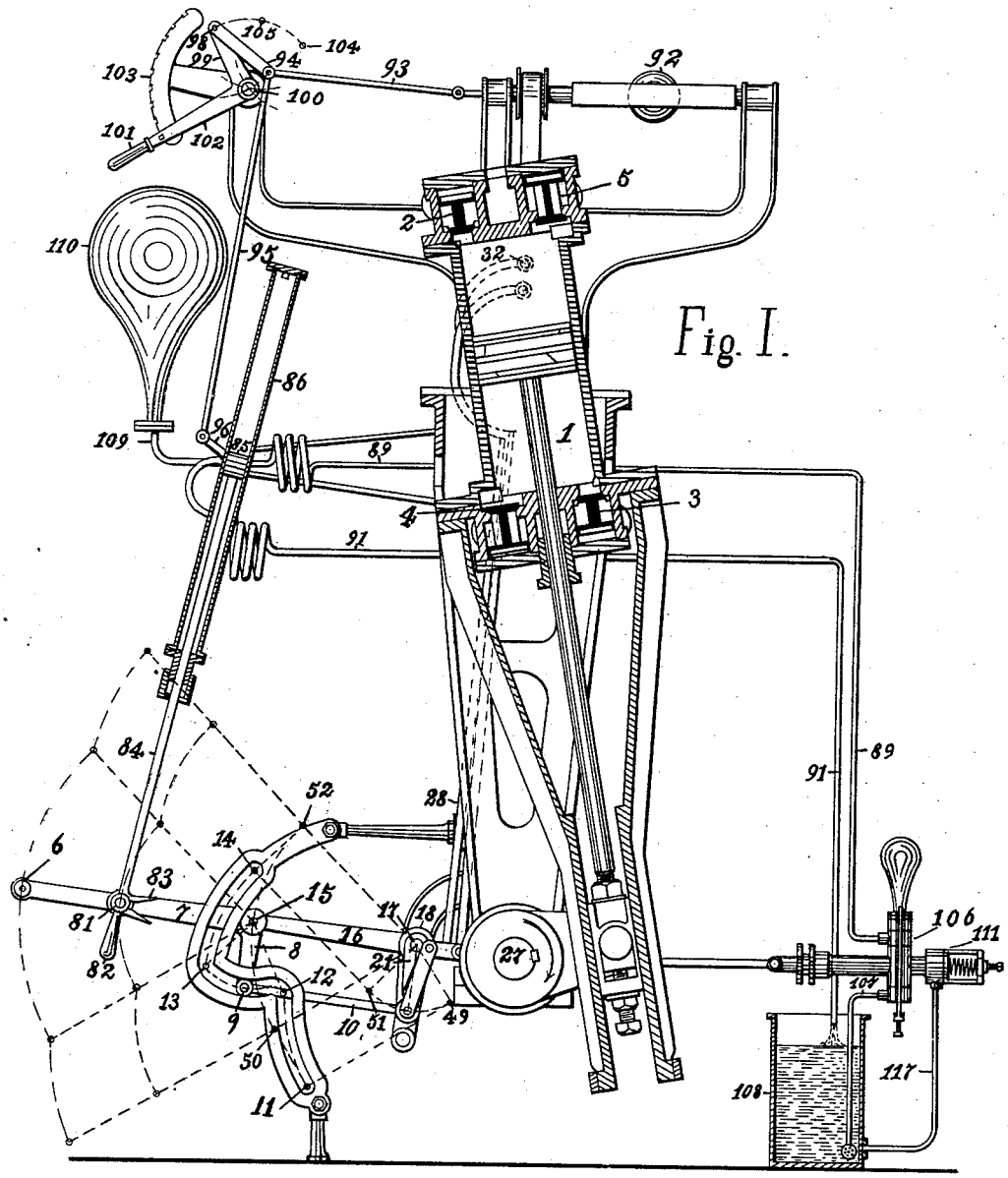
Fig. I.
WITNESSES:
Hermann Wiedling
INVENTOR (No Model.) 5 Sheets—Sheet 2.
H. WIEDLING.
VALVE GEAR FOR ENGINES.
No. 341,085. Patented May 4, 1886.
Fig. II.
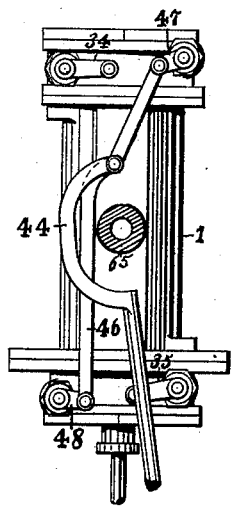
Fig. IV.
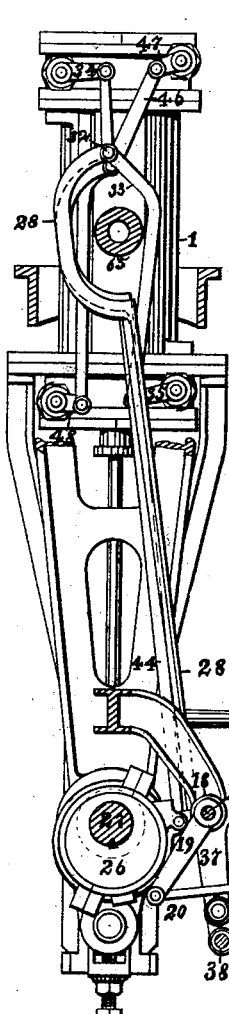
Fig. III.
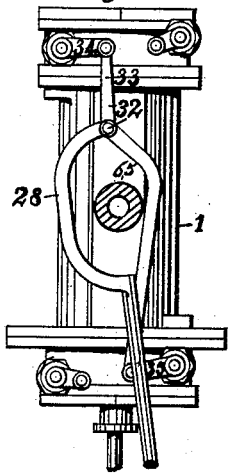
WITNESSES:
Hermann Wiedling
INVENTOR (No Model.) 5 Sheets—Sheet 3.
H. WIEDLING.
VALVE GEAR FOR ENGINES.
No. 341,085. Patented May 4, 1886.
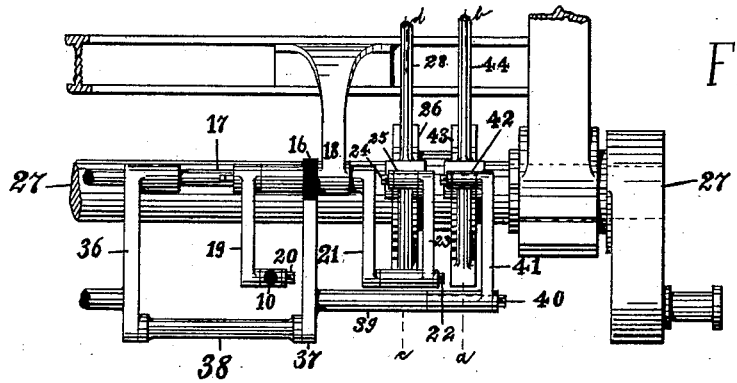
Fig. V.
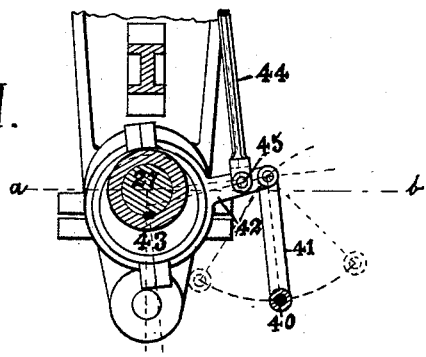
Fig. VI.
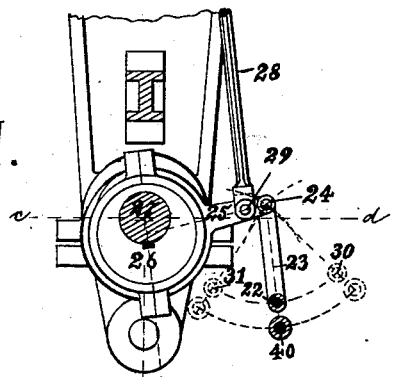
Fig. VII.
WITNESSES:
Hermann Wiedling
INVENTOR (No Model.) 5 Sheets—Sheet 4.
H. WIEDLING.
VALVE GEAR FOR ENGINES.
No. 341,085. Patented May 4, 1886.
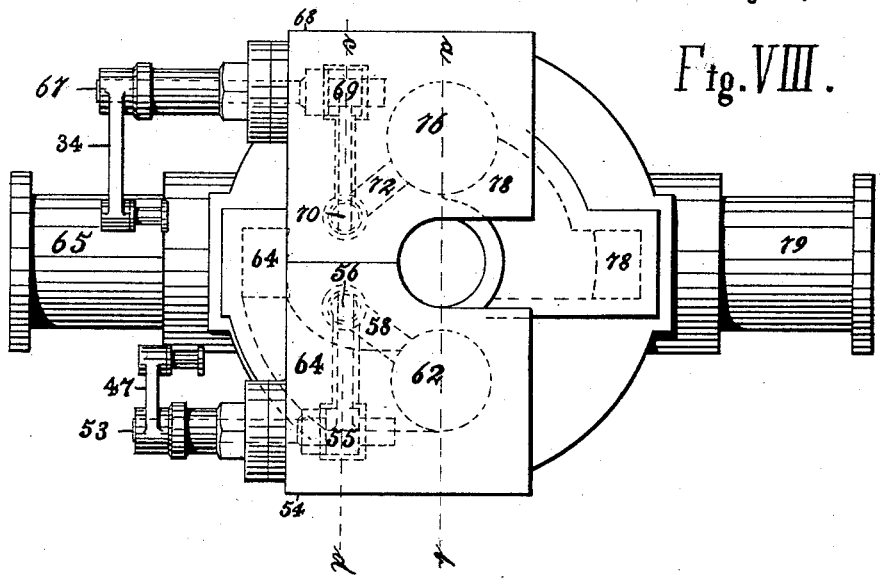
Fig. VIII.
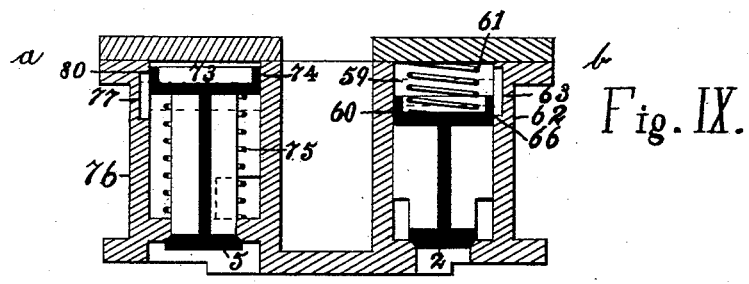
Fig. IX.
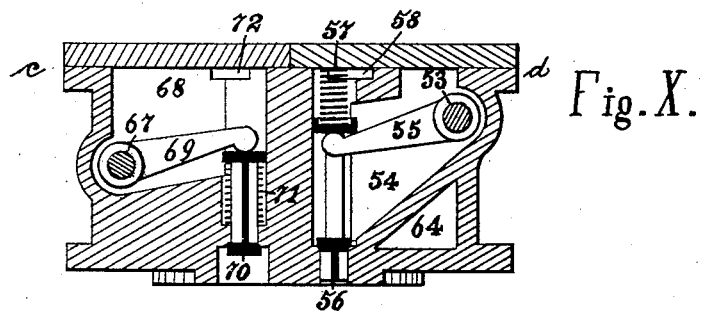
Fig. X.
WITNESSES:
Hermann Wiedling
INVENTOR

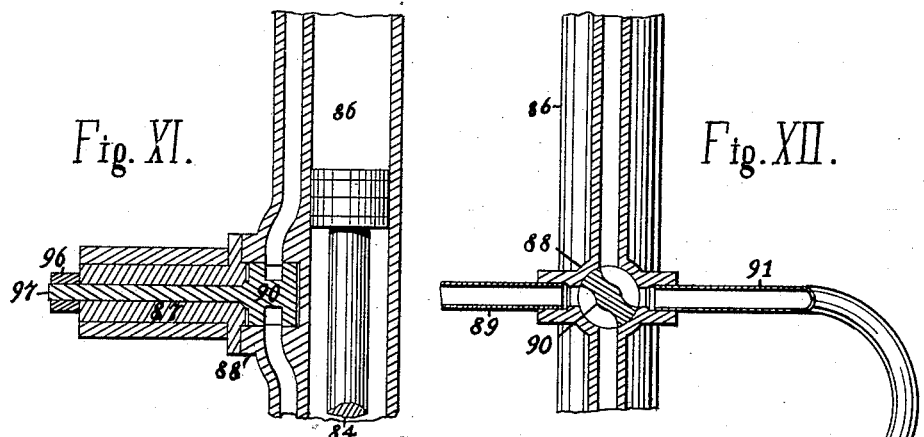

UNITED STATES PATENT OFFICE.

HERMANN WIEDLING, OF NEW YORK, N. Y., ASSIGNOR, BY DIRECT AND MESNE ASSIGNMENTS, TO THE WIEDLING MOTOR COMPANY, OF SAME PLACE.

VALVE-GEAR FOR ENGINES.

SPECIFICATION forming part of Letters Patent No. 341,085, dated May 4, 1886.

Application filed August 12, 1885. Serial No. 174,174. (No model.)

*To all whom it may concern:*

Be it known that I, HERMANN WIEDLING, a citizen of the Empire of Germany, residing in the city, county, and State of New York, have invented certain new and useful Improvements in Valve-Gears for Steam, Gas, or Air Engines, of which the following is a specification.

My invention relates especially to that class of steam, gas, or air engines which must generate power by the expansion of the fluid very economically, and which must work with a highly-variable power, and which must be so constructed that they can be handled and will work economically even in the hands of an unskilled and inexperienced person.

In the accompanying drawings, Figure I shows a side elevation of the engine with the oscillating working-cylinder in section. Fig. II shows an elevation of the working-cylinder with only the inlet-valve rods and levers, and Fig. III the same with only the outlet-valve rods and levers. Fig. IV is a side elevation of the engine with the frame partially broken so as to show the rods and levers of the inlet and exhaust valves when all connected together. Fig. V is a front elevation of the crank-shaft and the link-motion with the combination reversing-levers taken off. Fig. VI is the reversing and cut-off mechanism for the inlet-valves. Fig. VII represents the reversing and cut-off mechanism for the exhaust-valves. Fig. VIII is a view of the top head of the working-cylinder, and Fig. IX a section of the cylinder-head, taken on the line *a b* of Fig. VIII, and Fig. X a section of the cylinder-head, taken on the line *c d* of Fig. VIII. Fig. XI is a section of the central part of the hydraulic cylinder for moving the lever of the combination valve-gear, and Fig. XII is a section showing the central part of the hydraulic cylinder with the channels of its valves. Fig. XIII is a section taken at right angles to the axis of the hydraulic cylinder, and Fig. XIV shows the section of the hydraulic pump used to force the fluid to work the hydraulic cylinder.

The parts are similarly numbered in all the figures.

The cylinder 1, Fig. I, represents in section the inlet-valves 2 and 3, and the exhaust-valves 4 and 5. By handle 6 of L-shaped lever 7 the combination valve-gear may be worked by hand. The arm 8 of lever 7 carries the roller 9 and the rod 10. The roller 9 slides in the curved guide 11 12 13 14, while the lever 7 is pivoted by pin 15 to arm 16 on the reversing-shaft 17, which rocks in its bearings 18. The arm 19, Fig. IV, is keyed to the shaft 17, and is connected by pin 20 and rod 10 with the arm 8. The arm 21 is also keyed to the shaft 17, and carries by its pin 22 the swinging link 23, which connects by pin 24 with the eccentric-rod 25 of the eccentric 26 on the main crank-shaft 27 of the engine. The swinging link 23 is a guide for the pin 24 of eccentric-rod 25. The latter forms a lever for the valve-rod 28, which is connected therewith by pin 29, and thus the well-known simple link-motion is produced, which is reversed by simply changing the position of the fulcrum 22 of the swinging link 23, as indicated by dotted line 30 31, Fig. VII.

Theoretically, to give a perfect valve motion the pin 24 of eccentric-rod 25 must move in a straight line; but as it swings in an arc, of which the link 23 is the radius, its motion would be incorrect just so far as the pin 25 moves out of a straight line. The rod 28 is attached by pin 32, Fig. IV, to the rod 33, which connects the arms 34 and 35 of the exhaust-valves. The motion of the eccentric 26 is identical with that of the main crank-shaft of the engine, and so link 23 will move out of its central position in unison with the oscillation of the working-cylinder, and with the latter will oscillate the pin 32 of the valve-rod 28, so that the pin 32 will move out of a straight line in harmony with the pin 24 of the link 23. In this way the oscillation of the link is equalized by the oscillation of the pin 32 together with the working-cylinder, so that the valve motion is a perfect one.

The arms 36 and 37 are movable on the reversing-shaft 17, and are connected by a bar, 38. The arm 37 is a branch of the arm 16, which is shown in Fig. V broken off. The extension-bar 39, solidly connected with the arm 37, holds by pin 40 the link 41 of the inlet-valve connection.

42 is the eccentric-rod, and 43 the eccentric for the same, which is keyed on the main shaft parallel to the exhaust-eccentric 26. The rod 44 connects by pin 45 the eccentric-rod 42 with the valve-rod 46, which moves the inlet-valve arms 47 and 48.

The inlet-valve motion is reversed, and the cut-off is changed by altering the position of the fulcrum 40 of the swinging link 41, in the same way as described for the exhaust-valve motion; and in same manner the oscillation of the link 41 is equalized.

Fig. I shows the combination valve-gear in its central position. When lever 7 is moved out of this position, the end of the arm 16 will at first keep its place while the roller 9 is moving in the portion 12 13 of the guide, as the roller 9 is guided in an arc, of which the arm 9 is the radius, around the center 15. In this way, through rod 10, arm 19, and shaft 17, only the exhaust-valve gear will be moved out of the central position. When the roller 9 has reached the position 12, as shown in Fig. IV, the pin 20 of arm 19 of the exhaust-valve gear is in position 49, Fig. VII, and by the further movement of lever 7 the roller 9 will follow the curve 12 11, around 49 as a center, whereby the arm 16 is moved from the position 15 to 50, which operates the inlet-valve connections, opening the valves to drive the main crank-shaft in one direction. If the lever 7 is moved so that the roller 9 is in the position 13, the arm 19 of the reversing-shaft 17 of exhaust-valve gear is in position 51, and by a further movement of lever 7 the roller 9 will run in the arc 13 14, which has its center at 51. Thus the arm 19 of the exhaust-valve gear will keep its position, while arm 16 of the inlet-valve gear is moved to position 52. In this way both the exhaust and the inlet valve-gears can be reversed or regulated by one handle, each one moving independent of the other one; and if the valve-gear of the inlet-valves is set for full admission, or for a very low degree of admission, the exhaust-valves will always give full opening, and so avoid back-pressure. Besides, it is made impossible to set the inlet-valve gear for the revolution of the engine in one direction, while the exhaust-valve gear is set for the revolution of the engine in the other direction, which could take place if inlet and exhaust valve-gears had to be handled by two separate levers. This construction of valve-gear enables the engine also to work as a perfect compressor, as the exhaust-valve gear can be adjusted so that the exhaust-valves will close at any point of the piston-stroke without the inlet-valves being operated by their link-motion, so that the engine can work as a very economical brake.

In the top view of the cylinder-head in Fig. VIII, 47 is the lever for the inlet-valve 2. It is keyed to shaft 53, which, inside of the casing 54, Fig. X, works the lever 55. The latter moves the small secondary inlet-valve 56, which is pressed to its seat by a spring, 57. From within the casing 54 the port 58 opens into the space 59 on top of the piston 60 of the inlet-valve 2, which is kept to its seat by a spring, 61. The piston 60, together with valve 2, is movable in the cylindrical valve-chamber 62, which has a recess, 63. The space in the chamber 62 below the valve-piston 60 is in connection with the inlet-channel 64, which may be supplied with pressure through the hollow trunnion 65. When by lever 47, shaft 53, and lever 55 the secondary inlet-valve 56 is lifted, the pressure in space 59 on top of piston 60 is reduced, as it flows out partially through channel 58 and valve 56 into the main cylinder, and so the main valve 2 is lifted from its seat by the full pressure below its piston 60 until it travels a certain distance above the edge 66 of recess 63, whereby the latter makes communication between the space below the piston 60 and the space 59 above piston 60, so that a certain amount of pressure flows again into space 59, and decreases the difference of pressure in space 59 above and the space below piston 60 so much that the piston will be kept, with its valve 2, in this certain distance above the seat of valve 2. If the secondary valve 56 is closed again by its spring 57 while lever 55 returns to its first position through recess 63, the pressure above piston 60 is increased so much that the spring 61 forces the piston disk-valve 2 again to its seat, whereby the fluid in the space 59 forms a cushion after the piston has passed the edge 66 of the recess 63. The lever 34, keyed on shaft 67, Fig. VIII, moves within the casing 68, by the lever 69, the secondary exhaust-valve 70, which is pressed to its seat by spring 71. The space 68 is connected by port 72 with the space 73 above the piston 74 of the main exhaust-valve 5. The piston 74 is movable in cylindrical valve-chamber 76, which has the recess 77. The valve-chamber 76 communicates by channel 78 with hollow trunnion 79, through which the exhaust passes. When the secondary exhaust-valve 70 is opened by lever 69, pressure flows out of the working-cylinder through the valve 70, within the casing 68, and through the port 72 into the space 73 above the piston 74, and lifts the exhaust-valve 5 off its seat until piston 73 passes a certain distance over edge 80 of recess 77, and makes more or less communication between the space 73 above the piston 74 and the space below the same, whereby so much pressure flows out from space 73 that the exhaust-valve 5 is kept a certain distance above its seat. As the lever 69 moves back again to its first position, secondary exhaust-valve 70 is closed by its spring 71, all the pressure flows out of space 73 above piston 74, and the spring 75 moves the main exhaust-valve again to its seat, whereby the fluid in space 73 acts as a cushion after the piston 74 has passed the edge 80 of the recess 77.

The operation of the valves 3 and 4 is similar to that of 2 and 5. If the engine is in rotation, and the secondary inlet and exhaust-valves are not operated by their levers, the main inlet and exhaust valves are freely movable, and the main exhaust-valves will be opened by suction and the main inlet-valves by the compression-pressure of the working-cylinder, so the engine can work like an ordinary compression-pump.

The lever 7 of the combination valve-gear, Figs. I and IV, has the pin 81, with which, by handle 82, the hook 83 of piston-rod 84 can at will be connected or disconnected. The piston 85 of the rod 84 moves in the hydraulic cylinder 86, (see Fig. XI,) which swings on its trunnion 87, so that it can follow to the oscillations of the lever 7. The valve-casing 88 of cylinder 86 is supplied by the pipe 89 with fluid under pressure, which can be admitted by valve 90 to either end of the cylinder 86, while simultaneously the opposite end of the cylinder will be connected by the same valve with the outlet-pipe 91. The valve 90 is operated by the speed-governor 92, which by its rod 93, link 94, rod 95, arm 96, and stem 97 transmits its action to the valve 90. Link 94 swings on pin 98 of arm 99, which latter can be moved on its axis 100 by the handle 101 of lever 102. The motion of levers 102 and 99 is limited by the graduated quadrant 103, and so the pivot 98 of link 94 can be swung into the position 104, whereby the oscillations of rod 93 of the governor 92 will produce by link 94 and rod 95 oscillations the reverse of those which it will have when the pivot 98 of link 94 is in the position shown in the drawings. In this way the valve 90 of the hydraulic cylinder 86 will be reversed by the same position of the governor-rod 93, and will be oscillated in the opposite direction by a motion or oscillation of the governor-rod 93 in the same direction, so that the piston 85 of the hydraulic cylinder 86, controlled by valve 90, will move the lever 7 of the combination-valve gear into an opposite position, and will be oscillated in an opposite direction by the oscillation of the governor-rod 92 in the same direction. Thus the valve-gear of the engine is set and regulated automatically for the revolution of the engine in the opposite direction by simply reversing the position of the link 94.

When by the handle 101 the pivot 98 of link 94 is moved toward its central position, 105, the oscillations produced in valve 90 by the governor-rod 93 are shortened, whereby the sensitiveness of the governor can be regulated, or the action of the latter also be stopped by moving the pivot 98 into the central position, 105, where the governor-rod 93 will oscillate the rod 95 without producing an oscillation of the valve 90, which is thus kept in its central position.

The pressure supply-pipe 89 of the hydraulic cylinder 86 is in communication with the hydraulic force-pump 106, which draws by its suction-pipe 107 fluid from tank 108, to which it is driven back again through outlet-pipe 91 after it has done its work in the hydraulic cylinder 86.

The branch pipe 109 of the pressure-supply pipe 89 communicates with the accumulator 110, which is of such dimensions that it can store enough fluid under pressure to work the piston 85 of the hydraulic cylinder 86 after the engine is stopped, so that the valve-gear is always automatically moved back to its starting position when the engine stops.

When the engine is working, the pump 106 will force more fluid than the hydraulic cylinder 86 will use or the accumulator 110 can store, and to provide for that the forcing-pump 106 has a differential safety-valve 111, which will open against its spring 112, when the pressure rises above a certain limit, and let the fluid out of the pump 106 into the cylindrical space 113, where it moves the piston-valve 114, (which is attached to stem 115 of safety-valve 111,) above the edge 116 of cylindrical valve-chamber 113, and thus makes communication with waste-pipe 117, which returns the fluid into reservoir 108; but as the piston-valve 114 is much larger than the safety-valve 111 much less specific pressure is required to keep it open, whereby the hydraulic pump 106 is relieved of most of its pressure.

Having thus described my invention, what I claim, and desire to secure by Letters Patent of the United States, is—

1. The combination, in a steam, gas, or air engine, of two systems of valve-gears and a single lever to handle or set the same, whereby one system may be regulated or set while the other remains in its place, substantially as set forth and shown.

2. The combination, in a steam, gas, or air engine, of two systems of valve-gears, a lever to operate the same, and a curved guide to give said lever when moved a certain reciprocating motion, substantially as and for the purposes set forth.

3. The combination, with a steam, gas, or air engine, of two systems of valve-gears, a lever to operate the same, a guide-roller upon said lever, and a curved slotted guide to control the movements of said lever, substantially as and for the purposes set forth.

4. The combination, with an oscillating steam, gas, or air engine, of an oscillating cylinder provided with valves, a valve-rod to control and operate said valves, and a link connected to said valve-rod, whereby the oscillations thereof produced by the oscillating cylinder are equalized in harmony with the oscillations of said cylinder, substantially as and for the purposes set forth.

5. The combination, with a steam, gas, or air engine, of a speed-governor thereupon, a valve-gear connected with said governor, a lever to reverse the action of said governor, whereby the movement of the valve-gear will be reversed by reversing the action of said governor, substantially as and for the purposes set forth.

6. The combination, with a steam, gas, or air engine, of a speed-governor, valve-gear, and an adjustable swinging link connected to said governor, whereby the action of the governor may be shortened or reversed, substantially as and for the purposes set forth.

7. The combination, with a steam, gas, or air engine, of a reversing-valve gear, a hydraulic cylinder and piston to operate the same, a valve to control the admission of fluid into said cylinder, a valve-rod to operate the same, an adjustable swinging link connected with said valve-rod and the rod of a speed-governor, whereby the engine will be reversed by reversing the position of said swinging link, substantially as and for the purposes set forth.

8. The combination, with the cylinder of a steam, gas, or air engine, of an inlet-disk valve having a piston of a greater area than the valve-disk on its other end, a secondary outlet-valve, and a chamber connecting the valve-chambers, whereby the inlet-valve is opened by the release of pressure above its piston through said secondary outlet-valve, substantially as set forth.

9. The combination, with the cylinder of a steam, gas, or air engine, of an exhaust-disk valve having a piston with a greater area than the valve on its outer end, a secondary inlet-valve, and a chamber connecting the valve-chambers, whereby the main exhaust-valve is opened by the admission below its outer and larger piston of pressure from the main cylinder through said secondary valve, substantially as set forth.

10. The combination, with the cylinder of a steam, gas, or air engine, of disk-valves having each a piston thereto, and which are operated by the action of pressure from the main cylinder against their pistons, substantially as set forth.

11. The combination, with the cylinder of a steam, gas, or air engine, of disk-valves, each having a piston of greater area than the valve-disk, and cylindrical valve-chambers therefor, provided with recesses to allow the passage of pressure from one side to the other of said pistons, whereby the stroke of said valves is regulated and a cushion is formed therefor, substantially as set forth.

12. The combination, with a steam, gas, or air engine, of a hydraulic cylinder to regulate the valve-gear thereof, a hydraulic pump to supply pressure to said cylinder, and an accumulator to store said pressure, whereby the valve-gears of said engine will be properly set after said engine has stopped, substantially as described.

HERMANN WIEDLING.

Witnesses:
 JAMES P. FOSTER,
 MIRON WINSLOW.